United States Patent
Li et al.

(10) Patent No.: US 7,783,677 B2
(45) Date of Patent: Aug. 24, 2010

(54) TRACKING FILE SYSTEM NAMESPACE CHANGES DURING TRANSACTIONS

(75) Inventors: Hui Li, Redmond, WA (US); Sarosh Cyrus Havewala, Kirkland, WA (US); Neal R Christiansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 11/852,351

(22) Filed: Sep. 10, 2007

(65) Prior Publication Data

US 2008/0243936 A1 Oct. 2, 2008

Related U.S. Application Data

(60) Provisional application No. 60/921,190, filed on Mar. 30, 2007.

(51) Int. Cl.
G06F 17/30 (2006.01)
(52) U.S. Cl. .................................... 707/803; 707/695
(58) Field of Classification Search .............. 707/1–3, 707/9, 10, 100, 102, 104.1, 200, 203
See application file for complete search history.

(56) References Cited

U.S. PATENT DOCUMENTS

| | | | |
|---|---|---|---|
| 6,687,701 B2 | 2/2004 | Karamanolis et al. | |
| 6,856,993 B1 | 2/2005 | Verma et al. | |
| 6,993,603 B2 | 1/2006 | Pudipeddi et al. | |
| 7,082,424 B2 | 7/2006 | Molnar | |
| 7,099,948 B2 | 8/2006 | Tormasov et al. | |
| 7,150,018 B2 | 12/2006 | Golds et al. | |
| 7,257,595 B2 * | 8/2007 | Verma et al. | 707/101 |
| 7,418,463 B2 * | 8/2008 | Verma et al. | 707/202 |
| 7,421,560 B2 * | 9/2008 | Thind et al. | 711/170 |
| 7,512,636 B2 * | 3/2009 | Verma et al. | 707/200 |
| 7,590,669 B2 * | 9/2009 | Yip et al. | 707/203 |
| 2005/0278383 A1 | 12/2005 | Kazar et al. | |
| 2006/0117056 A1 | 6/2006 | Havewala et al. | |
| 2006/0224643 A1 | 10/2006 | Carlson et al. | |

OTHER PUBLICATIONS

Zadok et al., "On Incremental File System Development", ACM Press, vol. 2, Issue 2, May 2006, pp. 1-39.
Hans "The Naming System Venture", retrieved at <<http://www.namesys.com/whitepaper.html>>, May 9, 2007, pp. 1-26.
"Filter Driver Development Guide", Microsoft Corporation, 2004, pp. 1-28.

* cited by examiner

Primary Examiner—Cam-Linh Nguyen

(57) ABSTRACT

Aspects of the subject matter described herein relate to tracking file system namespace changes during transactions. In aspects, a filter monitors operations that may affect a tracked portion of a transactional file system's namespace. When an operation that affects the tracked portion is received, a data structure is modified to track the changes. Nodes within the data structure are marked to indicate whether they can be seen inside or outside of the transaction. If the transaction commits or rolls back, nodes within the data structure are deleted and made visible as appropriate.

20 Claims, 11 Drawing Sheets

Before the rename

Non = TxNotTransacted
New = TxNewName
Ren = TxRenameOnCommit
Del = TxDeleteOnCommit After the rename

Bold = Move
*Italics* = Duplicate
Other = Stay

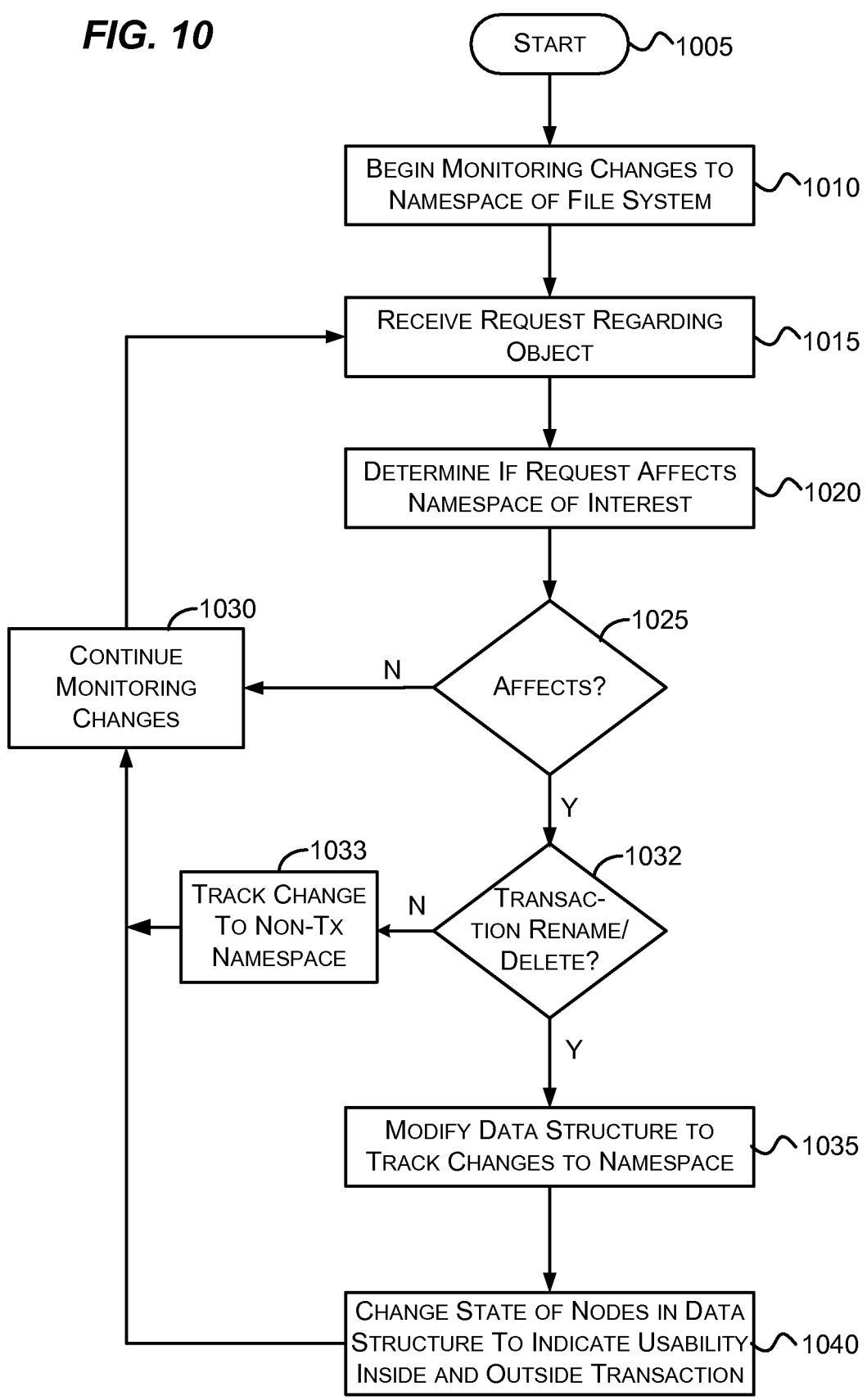

TRACKING FILE SYSTEM NAMESPACE CHANGES DURING TRANSACTIONS

CROSS REFERENCE TO RELATED APPLICATION

This application claims the benefit of U.S. Provisional Application No. 60/921,190, filed Mar. 30, 2007, entitled TRACKING FILE SYSTEM NAME SPACE CHANGES IN FILTER FOR TRANSACTIONS, which application is incorporated herein in its entirety.

BACKGROUND

With contemporary operating systems, such as Microsoft Corporation's Windows® Vista operating system with an underlying file system such as the Windows® NTFS (Windows® NT File System), FAT, CDFS, SMB redirector file system, or WebDav file systems, one or more file system filter drivers may be inserted between the I/O manager that receives user I/O requests and the file system driver. In general, filter drivers (sometimes referred to herein simply as "filters") are entities that enhance the underlying file system by performing various file-related computing tasks that users desire, including tasks such as passing file system I/O (requests and data) through anti-virus software, file system quota monitors, file replicators, and encryption/compression products.

For example, antivirus products provide a filter that watches I/O to and from certain file types (.exe, .doc, and the like) looking for virus signatures, while file replication products perform file system-level mirroring. Other types of file system filter drivers are directed to system restoration (which backs up system files when changes are about to be made so that the user can return to the original state), disk quota enforcement, backup of open files, undeletion of deleted files, encryption of files, and so forth. Thus, by installing file system filter drivers, computer users can select the file system features they want and need, in a manner that enables upgrades, replacement, insertion, and removal of the components without changing the actual operating system or file system driver code.

A file system filter may maintain internal metadata for files and directories on a volume. Changes to a volume that a filter is attached to may cause the internal metadata of the filter to be out of sync with the state of the volume. This may be complicated by a file system that supports transactions. This may cause the filter to behave incorrectly or render it unable to perform its desired function.

SUMMARY

Briefly, aspects of the subject matter described herein relate to tracking file system namespace changes during transactions. In aspects, a filter monitors operations that may affect a tracked portion of a transactional file system's namespace. When an operation that affects the tracked portion is received, a data structure is modified to track the changes. Nodes within the data structure are marked to indicate whether they can be seen inside or outside of the transaction. If the transaction commits or rolls back, nodes within the data structure are deleted or made visible as appropriate.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIGS. 10-11 are flow diagrams that generally represent exemplary actions that may occur in accordance with aspects of the subject matter described herein.

DETAILED DESCRIPTION

Exemplary Operating Environment

Figure 1:
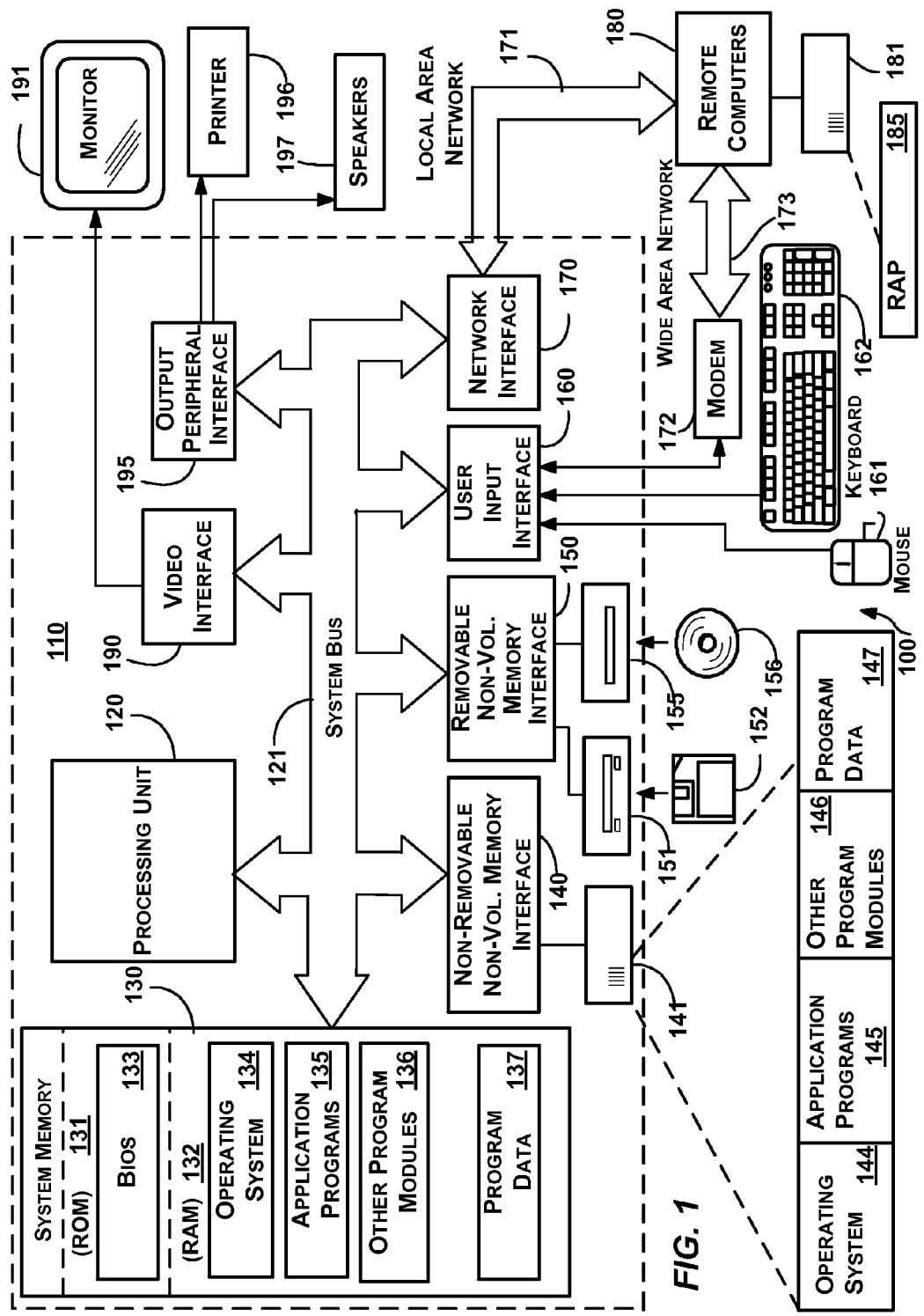
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Filters

Figure 2:
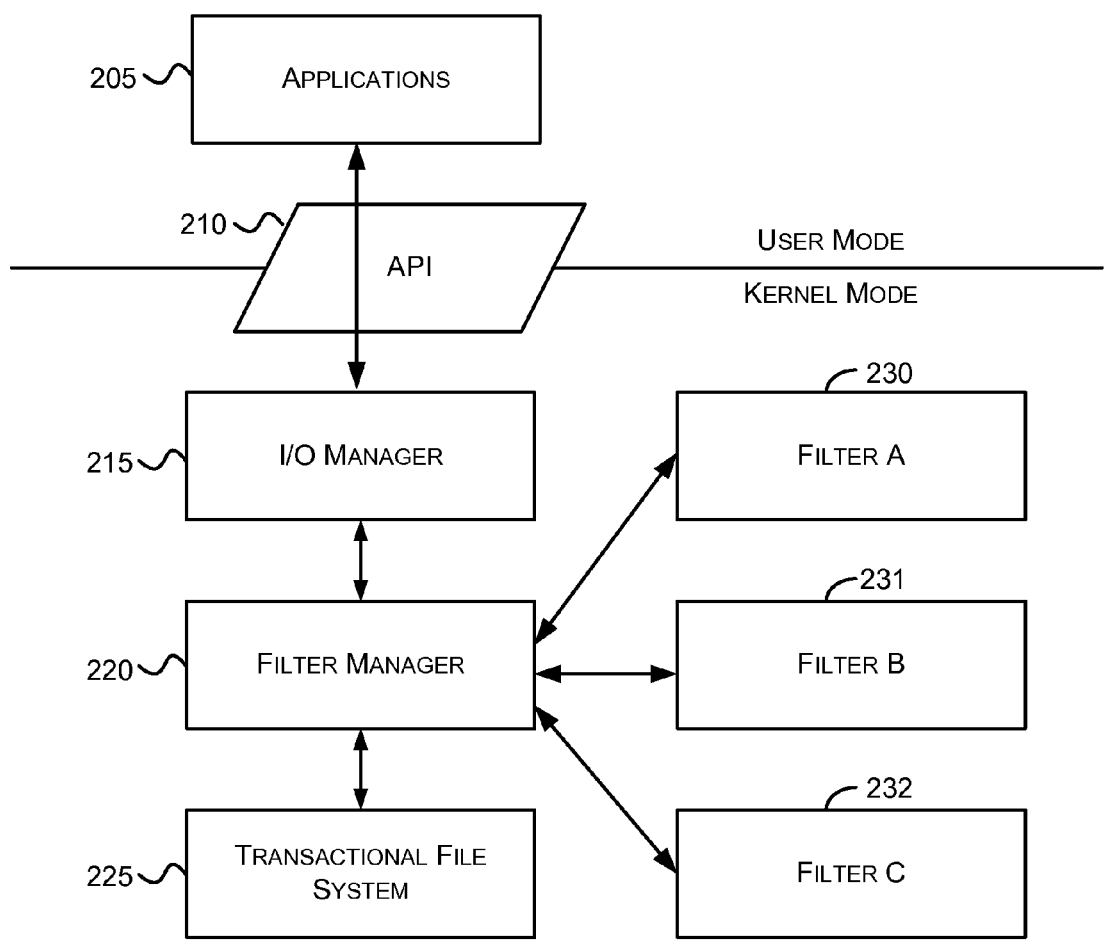
FIG. 2 is a block diagram representing an exemplary arrangement of components of a system that may operate in accordance with aspects of the subject matter described herein.

FIG. 2 is a block diagram representing an exemplary arrangement of components of a system that may operate in accordance with aspects of the subject matter described herein. The components include one or more applications 205, an applications programming interface (API) 210, an input/output (I/O) manager 215, a filter manger 220, a transactional file system 225, and one or more filters 230-232.

The applications 205 may make file system requests (e.g., via function/method calls) through the API 210 to the I/O manager 215. The I/O manager 215 may determine what I/O request or requests should be issued to fulfill each request and send each I/O request to the filter manager 220. The I/O manager 215 may also return data to the applications 205 as operations associated with the file system requests proceed, complete, or abort.

In one implementation, filters comprise objects or the like that when instantiated register (e.g., during their initialization procedure) with a registration mechanism in the filter manager 220. For efficiency, a filter may register for file system requests in which it may be interested in processing. To this end, as part of registration, each filter notifies the filter manager 220 of the types of I/O requests in which it is interested (e.g., create, read, write, close, rename, and so forth). For example, an encryption filter may register for read and write I/Os, but not for others wherein data does not need to be encrypted or decrypted. Similarly, a quota filter may be interested only in object creates, object writes, and other operations that may cause on-disk allocation change of a file.

In addition to specifying the types of I/O requests in which it is interested, a filter may further specify whether the filter should be notified for pre-callbacks and post-callbacks for each of the types of I/O. A pre-callback is called as data associated with an I/O request propagates from the I/O manager 215 towards the transactional file system 225, while a post-callback is called during the completion of the I/O request as data associated with the I/O request propagates from the transactional file system 225 towards the I/O manager 215.

From each I/O request, the filter manager 220 may create a data structure in a uniform format suitable for use by the filters 230-232. Hereinafter, this data structure is sometimes referred to as callback data. The filter manager 220 may then call and pass the callback data to each filter that has registered to receive callbacks for the type of I/O received by the filter manager 220. Any filters registered to receive callbacks for the type of I/Os received by the filter manager are sometimes referred to as mini filters.

Typically, the filter manager 220 passes callback data associated with a particular type of I/O request to each registered filter sequentially in an order in which the registered filters are ordered. For example, if the filters 230 and 232 are registered to receive callbacks for all read I/O requests and are ordered such that the filter 230 is before the filter 232 in processing such requests, then after receiving a read I/O, the filter manager 220 may first call and pass the callback data to the filter 230 and after the filter 230 has processed the callback data, the filter manager 220 may then call and pass the callback data (as modified, if at all) to the filter 232.

A filter may be attached to one or more volumes. That is, a filter may be registered to be called and receive callback data for I/Os related to only one or more than one volumes.

A filter may generate its own I/O request which may then be passed to other filters. For example, an anti-virus filter may wish to read a file before it is opened. A filter may stop an I/O request from propagating further and may instruct the filter manager to report a status code (e.g., success or failure) for the I/O request. A filter may store data in memory and persist this data on disk. In general, a filter may be created to perform any set of actions that may be performed by a kernel-mode or user-mode process and may be reactive (e.g., wait until it receives I/O requests before acting) and/or proactive (e.g., initiate its own I/O requests or perform other actions asynchronously with I/O requests handled by the I/O manager 215).

Figure 3:
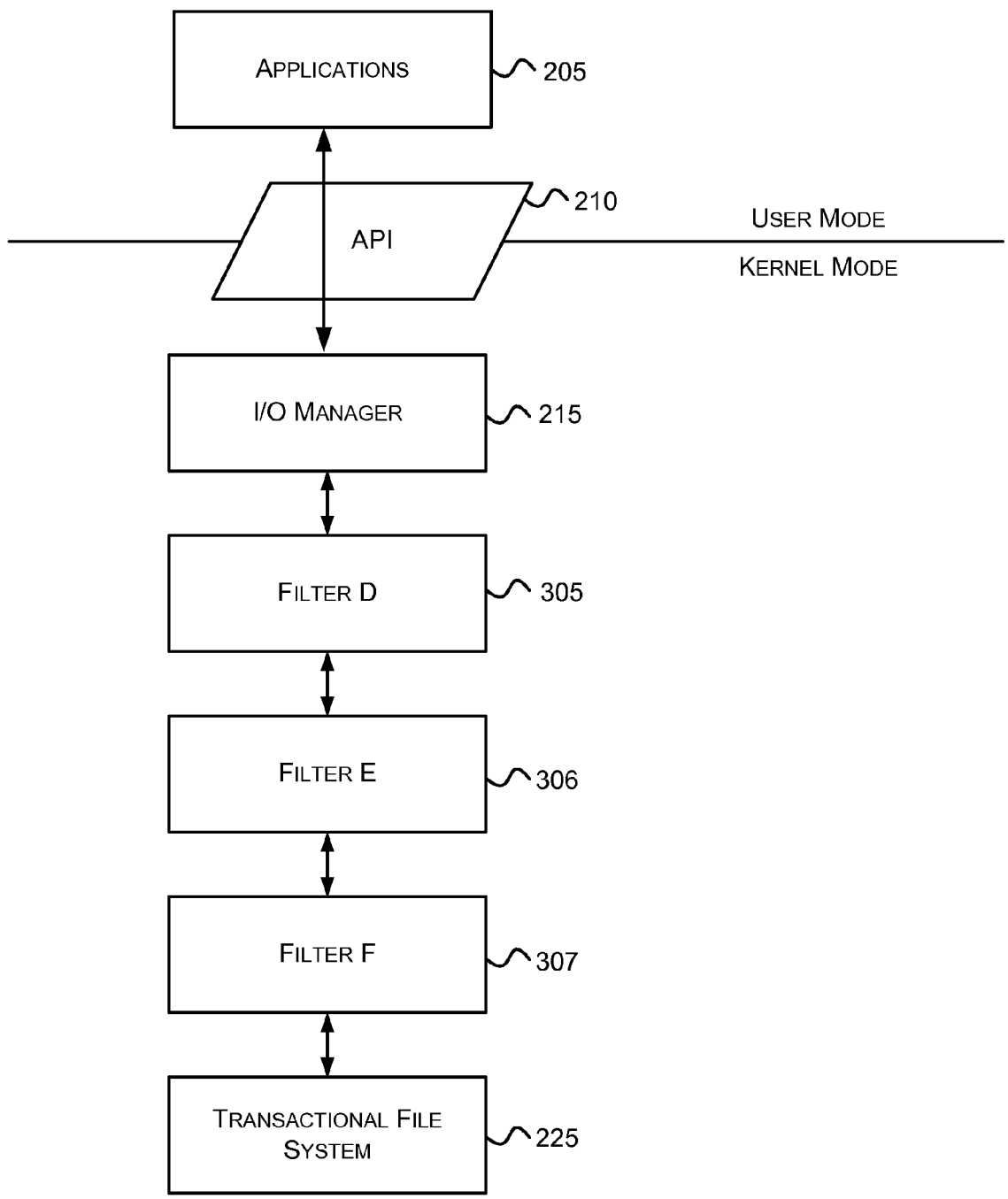
FIG. 3 is a block diagram representing another exemplary arrangement of components of a system that may operate in accordance with aspects of the subject matter described herein.

In one embodiment, filters may be arranged in a stacked manner as illustrated in FIG. 3, which is a block diagram representing another exemplary arrangement of components of a system that may operate in accordance with aspects of the subject matter described herein. In this embodiment, each of the filters 305-307 may process I/O requests and pass the requests (modified or unmodified) to another filter or other component in the stack. For example, in response to a read request received from one of the applications 205, the I/O manager 215 may issue an I/O request and send this request to the filter 305. The filter 305 may examine the I/O request and determine that the filter 305 is not interested in the I/O request and then pass the I/O request unchanged to the filter 306. The filter 306 may determine that the filter 306 will perform some action based on the I/O request and may then pass the I/O request (changed or unchanged) to the filter 307. The filter 307 may determine that the filter 307 is not interested in the I/O request and pass the I/O request to the transactional file system 225.

After the transactional file system 225 services the I/O request, it passes the results to the filter 307. Typically, the results pass in an order reverse from that in which the I/O request proceeded (e.g., first to filter 307, then to filter 306, and then to filter 305). Each of the filters 305-307 may examine the results, determine whether the filter is interested in the results, and may perform actions based thereon before passing the results (changed or unchanged) on to another filter or component.

Figure 4:
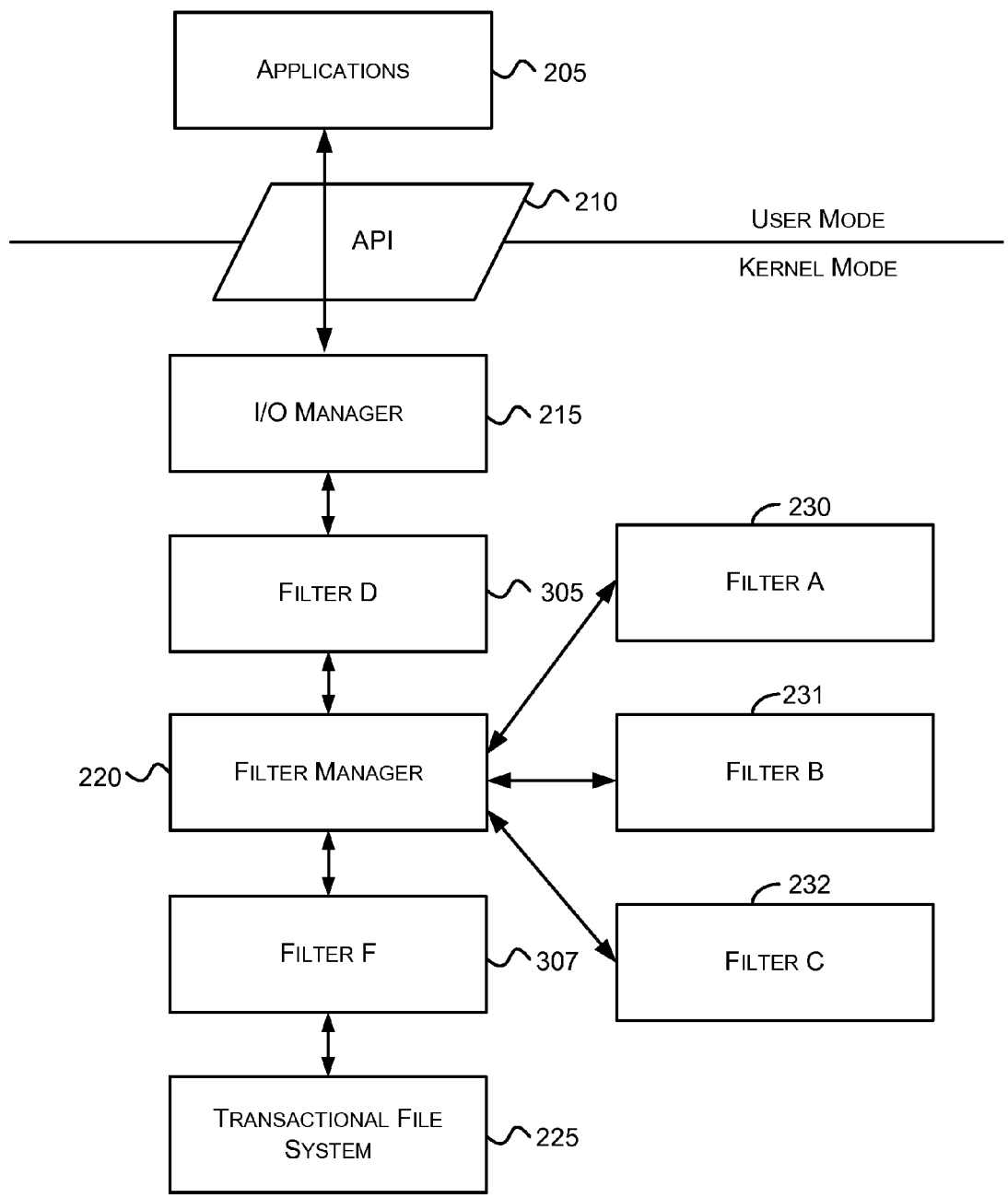
FIG. 4 which is a block diagram representing another exemplary arrangement of components of a system that may operate in accordance with aspects of the subject matter described herein.

In another embodiment, filters may be arranged in a stacked/managed manner as illustrated in FIG. 4, which is a block diagram representing another exemplary arrangement of components of a system that may operate in accordance with aspects of the subject matter described herein. In this configuration, some filters are associated with a filter manager while other filters are not. Filters that are associated with a filter manager (e.g., filters 230-232) are sometimes referred to herein as mini filters while filters that are not associated with a filter manager (e.g., filters 305 and 307) are sometimes referred to herein as legacy filters. The filter manager 220 is placed in a stack with other filters (e.g., filters 305 and 307).

It will be readily recognized that filters may be implemented in many other configurations without departing from the spirit or scope of aspects of the subject matter described herein. In some embodiments, a filter comprises any object that examines I/O between an application and a file system and that is capable of changing, completing, or aborting the I/O or performing other actions based thereon.

Returning to FIG. 2, the transactional file system 225 may operate on one or more volumes that may be located locally or remotely to the machine or machines upon which the applications 205 execute.

Some filters monitor files in certain directories. For example, a quota filter may enforce quota policies on particular directories. As another example, a data screen filter may deny the creation of certain types of files (e.g., files that may be copyrighted as indicated by an extension such, .MP3, .JPG, and the like) in certain directories. These filters may monitor a namespace that identifies the directories involved.

Certain file system requests (e.g., renames and deletes) may change the file system namespace for the objects monitored by a filter. For example, a quota filter may be configured to enforce a quota of one gigabyte on an object called C:\DIR\QUOTA. The object's name and the quota applicable to the object may be stored in a metadata file which is persisted on non-volatile storage. An application may rename the object C:\DIR to C:\D or may move C:\DIR\QUOTA to C:\QUOTA. To continue enforcing the quota on the QUOTA object, the quota filter monitors renames and updates its metadata file each time a rename affects an object for which the quota filter is enforcing a quota.

In some operating systems, a rename operation may rename an object and/or move the object. Thus, by monitoring rename operations, a filter may capture either a name rename, a move of an object, or both. In operating systems in which renaming the file and moving the file are separate operations, a filter may need to monitor both of these operations to maintain namespace consistency with the namespace of a file system.

In addition, an application may delete an object, for example, C:\DIR or C:\DIR\QUOTA. To avoid monitoring objects that have been deleted, not enforce policies when an existing object is deleted and a new object with the same name is recreated in its place, and to reduce the size of the metadata used in monitoring such objects, a filter may monitor deletes and update its metadata accordingly.

The transactional file system 225 comprises a mechanism for updating files inside or outside of transactions. Briefly, a process that is accessing an object within a transaction sees that object together with any changes made to the object within the transaction. Processes outside of the transaction do not see the changes made inside of the transaction unless the transaction commits. If a transaction rolls back (also known as "aborts"), the changes made within the transaction are undone and the object returns to its pre-transaction state. Transactions are well understood by those skilled in the art and will not be described in more detail here.

The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. In one embodiment, an entity comprises a process as defined above. In another embodiment, an entity comprises any one or more objects that is/are capable of performing actions associated with or using or one or more processes.

Figure 5:
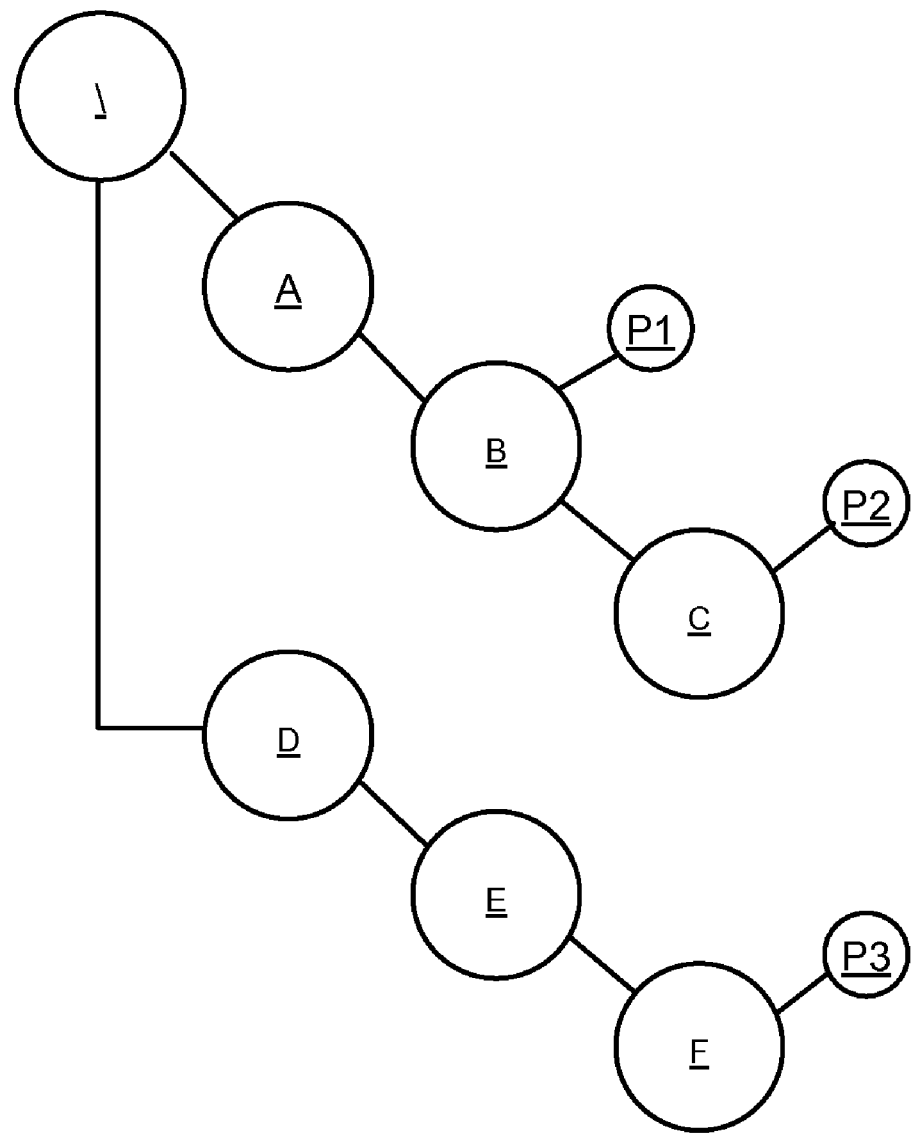
FIG. 5 is a block diagram representing an exemplary data structure that may be used to monitor objects that have policies applied to them in accordance with aspects of the subject matter described herein.

FIG. 5 is a block diagram representing an exemplary data structure that may be used to monitor objects that have policies applied to them in accordance with aspects of the subject matter described herein. As referred to herein, monitored objects may comprise directories, files, anything that may be stored on a file system, and the like.

The data structure includes a node for each object of interest and is sometimes referred to as a prefix tree. The exemplary objects represented include the root directory "\", \A, \A\B, \A\B\C, \D, \D\E, and \D\E\F. The objects \A\B, \A\B\C, and \D\E\F have policies P1, P2, and P3 applied to them, respectively. A policy may comprise a quota on disk space consumed by an object and its descendants (e.g., subdirectories), files allowed in an object and its descendants, what is allowed and/or not allowed with respect to an object and its descendants, and the like. When an object of interest is renamed or deleted on a file system, the data structure shown in FIG. 5 may need to be updated. Such updates may involve removing nodes, adding additional nodes, and changing the contents of nodes as described in more detail below.

In general, an object is of interest if renaming or deleting the object would affect finding the object in the data structure or the application of a policy. For example, if \D and its subdirectories were deleted, the policy P3 would no longer need to be applied to \D\E\F. Furthermore, the nodes D, E, and F would no longer be needed to apply the policy P3 and could be deleted to conserve space and decrease lookup time for any remaining policies.

As another example, if \A\B\C is renamed to \G on the file system, this may affect finding the new object in the data structure. Before a filter applies a policy to a particular operation, the filter needs to know whether the operation may affect any objects for which policies have been established. To find the new object in the data structure (e.g., so that a filter may determine if it needs to enforce a policy on a particular operation), a new node may be created and associated with the new object, the policies associated with the old node C (e.g., P2) may then be copied to the new node, and the old node C may then be deleted. Policies P2 may then be enforced for the new object.

In one embodiment, each leaf node of the prefix tree is associated with a policy while each non-leaf node may or may not be associated with a policy. When the policy associated with a leaf node is deleted, parents of the leaf node that do not have other children associated with policies may also be deleted.

A component that maintains the prefix tree does not need to understand how each object is defined. Instead, the component may call callbacks when events of interest occur. For example, the component may call a rename callback when a rename occurs, a delete callback when a delete occurs, and so forth.

An application (e.g., a service or otherwise) may communicate which objects have policies associated with them to a filter. The application may provide a list of such objects and may add and delete policies as desired. After receiving such a list or instruction, the filter may create a new data structure or modify an existing one to account for the objects of interest.

The data structure may be reconstructed at boot time or instantiation of a filter that uses the data structure. This may be done using the metafile described above that is persisted on non-volatile storage (e.g., a disk).

The data structure may be shared between more than one filter. For example, two or more filters may enforce policies to objects that may be renamed or deleted. Instead of maintaining a separate copy of the data structure for each filter, the two or more filters may share the data structure. One or more of the filters may be designated to keep the data structure in sync with the file system.

Furthermore, even though the filters may share the data structure, they may not wish to monitor all the same objects. To this end, additional data may be maintained that indicates nodes in which each filter is interested.

In a transactional file system, when an object is renamed, deleted, or otherwise changed within a transaction, the file system may make any changes to the object viewable only to entities involved in the transaction. While the transaction is in progress, entities outside of the transaction see the object as it existed before the transaction commenced. After the operation has completed, the changes made within the transaction may become persistent and viewable to other entities. If the transaction is rolled back, the transactional view may be purged and the state of the system may be returned to the state that existed before the transaction began.

A transactional file system poses some unique challenges to a policy that is attached to a particular object within the file system. For example, if a policy disallows the creation of certain types of files within a particular directory, and the directory is renamed within a transaction, the policy should be enforced on the directory in its original location to entities outside of the transaction making changes to the directory until the transaction commits. Furthermore, to entities within the transaction making changes to the directory, the policy should be enforced on the new directory location as soon as the directory is moved within the transaction. In addition, if the transaction is rolled back, the policy should continue to be enforced on the original directory. If the transaction is committed, the policy should cease to be enforced on the original directory and the prefix tree should be modified accordingly.

In one embodiment, a component (e.g., filter) in charge of maintaining a prefix tree maintains a separate prefix tree for each transaction. For example, a filter may duplicate a tree T to a new tree $T_n$ at the moment a directory in T is transactionally renamed or deleted. Once $T_n$ is formed, any following modification within the same transaction will be switched to $T_n$. $T_n$ will replace T on commit or be deleted when rollback. This approach may cost resources on the order of O(N) if N transactions are involved in modifying the prefix tree at a time, even though each transaction may only intend to rename/delete a single entry in the tree. In this embodiment, multiple trees may need to be merged into one when multiple transactions are committed.

In another embodiment, a single prefix tree may be used with flags that indicate whether a node is involved in a transaction. When a rename occurs within a transaction, the subtree involved with the rename is copied to a new location in the tree and the new subtree is marked as viewable to entities associated with the transaction. The original subtree is marked as invisible to entities associated with the transaction. Entities outside of the transaction continue to see and be regulated by policies within the original subtree while entities inside the transaction see and are regulated by policies within the new subtree. The unmodified parts of the tree are viewable to all the entities.

As an optimization, in one embodiment, when a node is copied to a new location and the node is associated with a policy, the node and the original node may still reference the same data structure that includes the policy. This may be done by having pointers in both nodes that point to the policy data structure. The policy may be enforced inside the transaction on the new location and outside the transaction on the original location of the object. If the policy changes within the transaction, the change affects the object in the new location. Policy changes outside of the transaction only affect the object at the original location.

Figure 6:
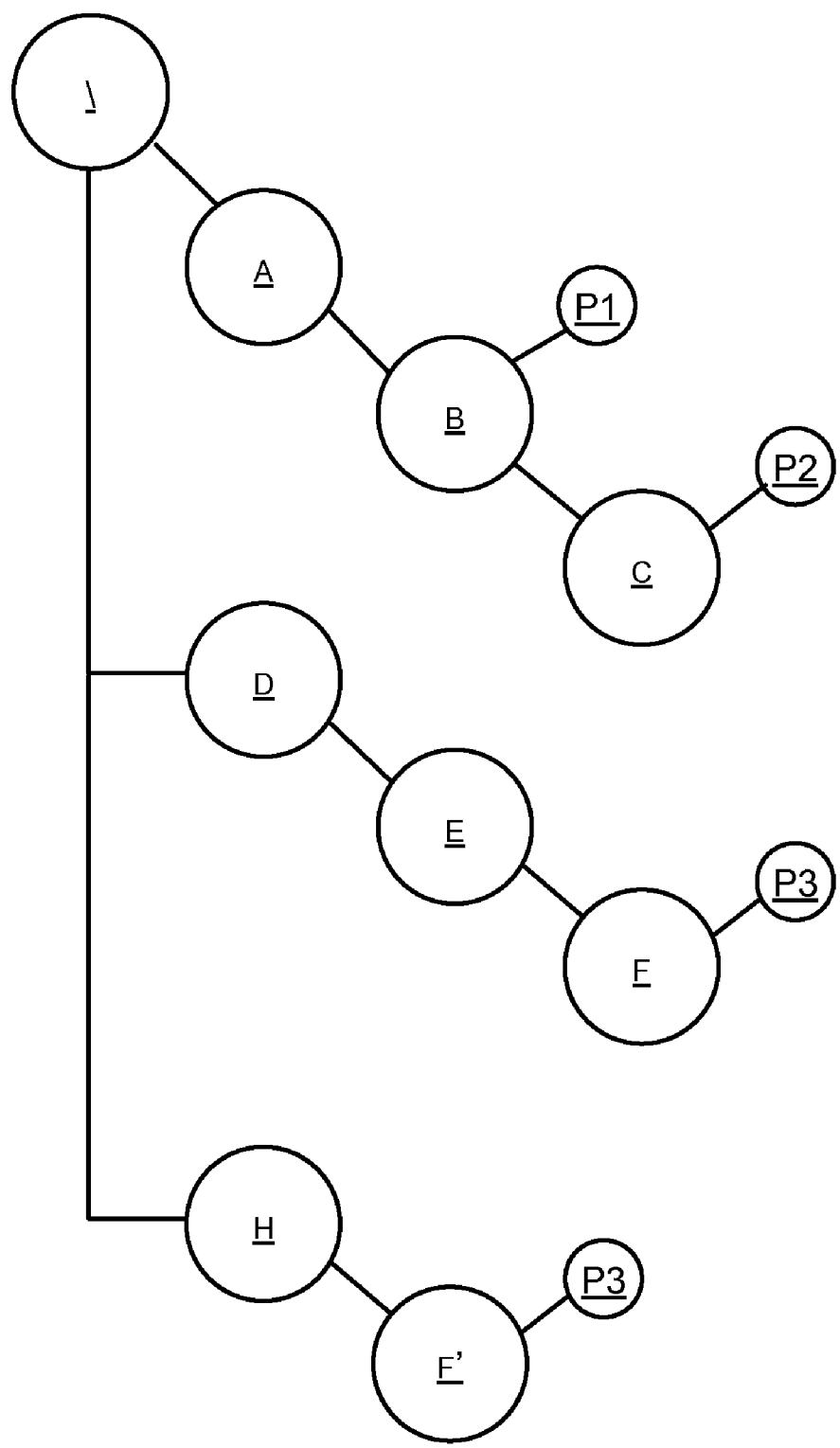
FIG. 6 is a block diagram representing an exemplary data structure that results from a change made to the data structure of FIG. 5 in accordance with aspects of the subject matter described herein.

FIG. 6 is a block diagram representing an exemplary data structure that results from a change made to the data structure of FIG. 5 in accordance with aspects of the subject matter described herein. In FIG. 6, the object \D\E of FIG. 5 has been renamed within a transaction to be object \H. When this occurs, the nodes in the subtree defined by \D\E are copied to \H and flagged as viewable to the transaction only. The nodes of the original subtree (\D\E and \D\E\F) are marked as invisible to the transaction. Furthermore, the nodes \D\E and \D\E\F are marked with a flag that indicates that they have been renamed during a transaction. If the transaction commits, the nodes \D\E and \D\E\F are deleted as well as any nodes that depended on their existence (e.g., the node \D). If the transaction is rolled back, the new subtree is deleted and the flags on the original subtree may be reset.

Additional actions associated with a given operation, for example a rename or delete, may be queued and delayed until the transaction commits or rolls back. For example, the filter may communicate with a user mode service to maintain additional state regarding the prefix tree or objects associated therewith. The filter may also update an on-disk metadata file that indicates the current state of the prefix tree to use, for example, in rebuilding the prefix tree in the case of a shutdown. These additional actions may be queued and delayed to occur after the transaction has committed. If the transaction rolls back instead, these actions may be removed from the queue.

When an object is renamed within a transaction and then renamed again, the subtree including the object does not need to be duplicated again. Instead, the subtree may be moved to its new location.

When an object is deleted in a transaction, the nodes in the subtree that include the object are flagged as invisible to the particular transaction. If the transaction commits, the flagged nodes are deleted. If the transaction is rolled back, the state of the invisible nodes are restored to their original state. When a tree entry is renamed and then deleted within the same transaction, a flag on its original peer may be set to indicate that the original peer is to be deleted on commit. The term "peer" is defined below.

To support transactions, a state may be associated with each node in a prefix tree. In one embodiment, a data structure suitable for assigning state may be defined as:

```
typedef enum _TREE_ENTRY_STATE {
    TxNotTransacted = 0,
    TxNewName = 1,
    TxRenameOnCommit = 2,
    TxDeleteOnCommit = 3,
} TREE_ENTRY_STATE;
```

TxNotTransacted indicates that a node is not currently involved in a transaction.

TxNewName indicates that a node is only viewable inside of its associated transaction. For instance, renaming node A to B inside of a transaction will cause a new tree entry of B in the TxNewName state. B is viewable inside of the transaction only.

TxRenameOnCommit indicates that a node includes its original non transacted name. For example, if node A is in TxNotTransacted state, renaming A to B inside of a transaction will change the state of A to TxRenameOnCommit. The tree entry of A can be seen by entities not involved in the transaction. A will be deleted if the transaction is committed. Deletion may be accomplished by calling the queued rename callback on commit.

TxDeleteOnCommit also indicates that a node includes the original non transacted name. For example, if node A is in a TxNotTransacted state, deleting A inside of a transaction will change the state of A to TxDeleteOnCommit. The tree entry of A can be seen by any entity outside of the transaction. A will be deleted when the transaction is committed. Once the state of a node is changed to TxDeleteOnCommit, the state will remain in this state even if a directory of the same name is re-created again. If a directory of the same name is re-created again, there will be no policy bound to the new directory of the same name, and no further rename/delete tracking will be performed on it. In addition, the queued action for this delete will be called on commit regardless of whether a directory of the same name exists during commit.

Additional states may be added to the above states for efficiency. For example, an indeterminate state (e.g., TxNewOrNotTransacted) may be added that indicates that an object has been added in the file system. The transactional file system may be implemented such that it is possible to query as to whether the object was added within or without a transaction, but this may be a relatively expensive operation. Instead, the object may be assigned the indeterminate state. When additional information is known about the object (e.g., a child is added to the object inside or outside of a transaction) that resolves the ambiguity of the state, the state can be changed.

A "peer" is defined when one of the following is true:

1. Assume S(A)=TxNotTransacted, where S(A) stands for the state of node A. If A is renamed to B in a transaction, A and B become peers.

2. Assume that A and B are Peers, S(A)=TxRenameOnCommit, and S(B)=TxNewName. If B is renamed to C, A and C become peers.

3. If renaming A to B in a transaction causes A's descendant C to be duplicated as B's descendant C, A's descendant C and B's descendant C are distinct nodes but are considered to be peers. This applies to each descendent of A that is duplicated as a descendent of B.

With peers, the following points are worth noting:

1. If S(x) equals TxRenameOnCommit, there exists a peer entry y and S(y)=TxNewName.

2. If S(x) equals TxNewName, x may or may not have a peer entry. If x has a peer entry y, S(y) is TxRenameOnCommit.

3. If S(x) equals TxNewName and x does not have a peer entry, x does not have a policy associated with it. This is described in the example below.

For instance, assume that \A\B\C is present on the prefix tree and \X\Y is not present on the tree. In one embodiment, renaming \A\B\C to \X\Y\Z inside of a transaction will cause the new path \X\Y\Z to be inserted into the tree. After the insertion, S(Z)=TxNewName, S(X) and S(Y) will depend on whether X and Y are created inside or outside of this transaction. If X and Y are both created inside of the transaction, they have no policy associated with them.

In one embodiment, under the above example, the following is true:

1. If S(X) equals TxNewName and X does not have a peer entry, X has a descendant with state TxNewName that has a peer entry having TxRenameOnCommit.

2. If S(X) equals TxDeleteOnCommit or S(x) equals TxNotTransacted, X does not have a peer entry.

The tree traversal is now based on two keys: Key1 and Key2. Key1 is the directory/file component name. Key2 is the new transaction key we defined above. Among the two keys, Key1 may take priority over the new Key2.

A definition of an exemplary data structure that may be used to index a prefix tree is as follows:

```
typedef struct __TREE__TX__KEY {
    PVOID Transaction; // or other unique ID which can identify
    a transaction
    TREE__ENTRY__STATE State;
    struct __ TREE__TX__KEY *PeerKey;
} TREE__TX__KEY, *PTREE__TX__KEY;
```

In a TREE_TX_KEY object, the Transaction member is a unique pointer or identifier that indicates that the tree entry is involved in a transaction. If the Transaction member is NULL, the tree entry may not be involved in a transaction; otherwise, the tree entry may be involved in a transaction indicated by the Transaction member. For example, if a TREE_TX_KEY object keyA={NULL, TxNotTransacted, NULL}, renaming A to B in transaction 12345 may change keyA to equal {12345, TxRenameOnCommit, &keyB} and generate a new keyB={12345, TxNewName, &keyA}. Note that the "&" followed by a key name indicates the memory address of the key name.

The PeerKey member is useful when the state of one tree entry needs to be updated when an event occurs on a peer. For example, keyA needs to be updated to TxDeleteOnCommit when B is deleted. In one embodiment, this state change in keyA may trigger a delete callback on A at commit.

Figure 7:
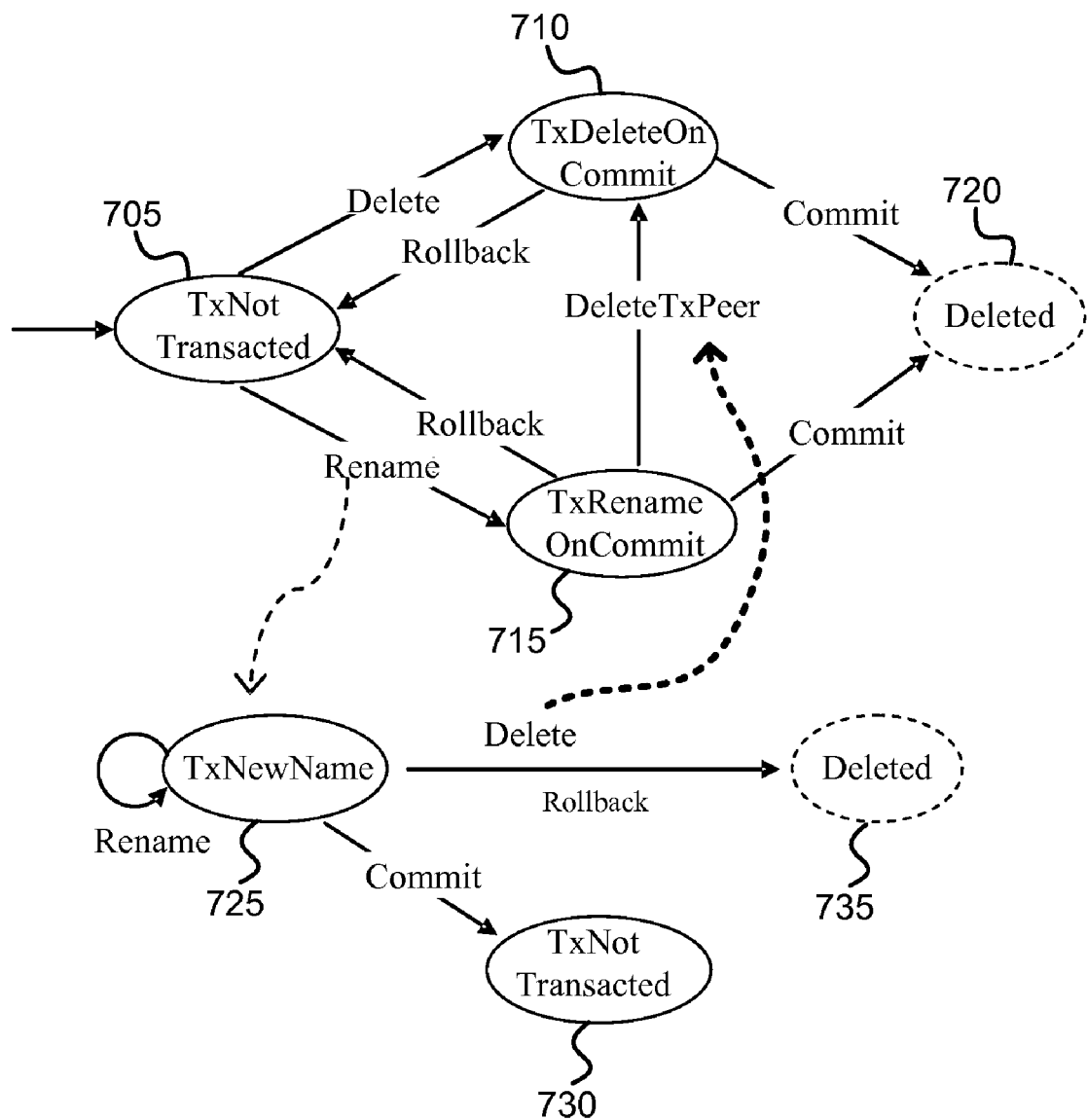
FIG. 7 is a state diagram that includes some exemplary transitions and states of nodes in a prefix tree that may exist in accordance with aspects of the subject matter described herein.

FIG. 7 is a state diagram that includes some exemplary transitions and states of nodes in a prefix tree that may exist in accordance with aspects of the subject matter described herein. The states include TxNotTransacted 705, TxDeleteOnCommit 710, TxRenameOnCommit 715, Deleted 720, TxNewName 725, TxNotTransacted 730, and Deleted 735.

When the state machine is in the state TxNotTransacted 705, the state machine may transition to the state TxDeleteOnCommit 710 when an object (e.g., a directory) associated with a node is deleted within a transaction. If the transaction is subsequently rolled back, the state machine may transition back to the TxNotTransacted state 705. If the transaction commits, the state machine may transition to the deleted state 720 at which time the node and any nodes that depend on the node (e.g., ancestors that do not have a policy associated therewith or a descendent with a policy associated therewith) may also be deleted.

If the state machine is in the state TxNotTransacted 705 and an object is renamed within a transaction, the state machine may transition to the state TxRenameOnCommit 715. In addition, one or more peer nodes (hereinafter "created nodes") may be created that are associated with another set of states (725, 730, and 735). If the object(s) associated with the one or more created nodes is/are deleted, the state machine may transition to both the deleted state 735 for the one or more created nodes and may trigger the TxDeleteOnCommit state 710 for the original peer nodes. If the transaction is rolled back, the state machine may transition to the deleted state 735 for the created nodes and the TxNotTransacted state 705 for the original nodes. In the deleted state 735, the one or more created nodes is/are deleted.

If a created node is renamed, the state machine remains in the TxNewName state 725. A new created node is created and the old created node is deleted.

If a commit occurs while in the TxNewName 725 state, the state machine transitions to the TxNotTransacted state 730 for the one or more created nodes while the state machine also transitions to the deleted state 720 for the original node. At this point the original peer node is deleted and the created nodes become visible to entities outside the transaction. If a delete occurs to a node in the TxNewName 725 state, the node's peer is set to TxDeleteOnCommit while the state machine transitions to the Deleted state 735 and the TxDeleteOnCommit state 710.

Following are a few exemplary state transitions:

| | |
|---|---|
| Assume S(A) = | TxNotTransacted and B and C do not exist. |
| Rename A to B → | S(A) = TxRenameOnCommit, S(B) = TxNewName |
| Rename B to C → | B is deleted, S(C) = TxNewName, S(A) = TxRenameOnCommit |
| Delete C → | C is deleted, S(A) = TxDeleteOnCommit |
| Assume S(A) = | TxNotTransacted, B does not exist. |
| Rename A to B → | S(A) = TxRenameOnCommit, S(B) = TxNewName |
| Rename B to A → | B is deleted, S(A) = TxRenameOnCommit, S(A*) = TxNewName |
| | A* represents the transacted version of A |
| Assume S(A) = | TxNotTransacted. |
| Delete A → | S(A) = TxDeleteOnCommit |
| Assume S(A) = | TxDeleteOnCommit. |
| Mkdir A → | S(A) = TxDeleteOnCommit |
| Rename A to B → | S(A) = TxDeleteOnCommit (B is created) |
| Delete B → | S(A) = TxDeleteOnCommit |

Figure 8:
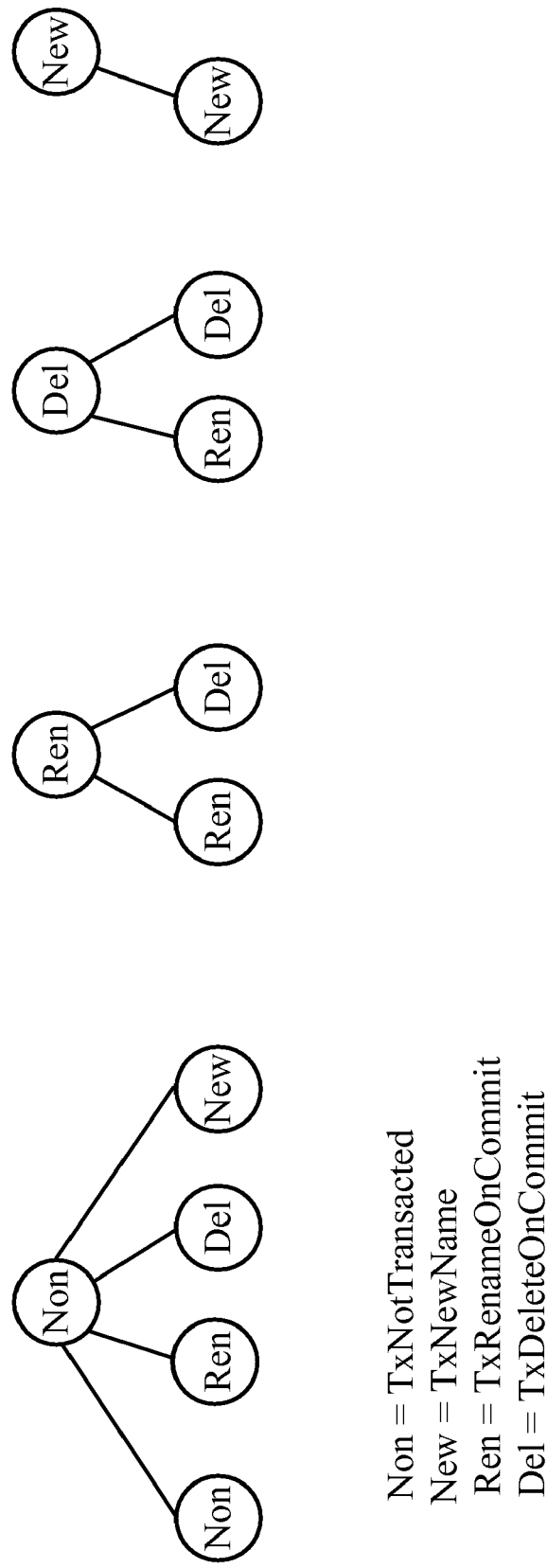
FIG. 8 is a block diagram representing some exemplary possible parent/child relationships in accordance with aspects of the subject matter described herein.

FIG. 8 is a block diagram representing some exemplary possible parent/child relationships in accordance with aspects of the subject matter described herein. In one embodiment, the following rules apply to relationships within a prefix tree:

1. If S(parent) is equal to TxNotTransacted, then S(child) can be in any state. For instance, the root directory "\" may be in the state TxNotTransacted and can have children among all states.

2. If S(parent) is equal to TxRenameOnCommit, then S(child) may only be in the state TxRenameOnCommit or TxDeleteOnCommit.

3. If S(parent) is equal to TxDeleteOnCommit, then S(child) may only be in the state TxRenameOnCommit or TxDeleteOnCommit.

4. If S(parent) is equal to TxNewName, then S(child) may only be in the TxNewName state.

The rules above may be used to validate that a prefix tree is in an appropriate state.

In one embodiment, a file system may allow an object to be updated within only one transaction at a time. When an object is updated within a transaction, the file system may not allow other transactions to modify that object or any of its ancestors. This may be done so that a tree entry may have at most one peer.

In another embodiment, a file system may allow an object to be updated within two transactions at a time. Alternatively, or additionally, the file system may allow other transactions to modify ancestors of the object. This may involve a tree entry having two peers that may need to be reconciled when the transactions complete.

Tree Traversal

In one embodiment, a prefix tree may be traversed as defined below. A directory/file path name represented in the format of \$D_1$\\$D_2$\\$D_3$\ ... \\$D_n$ may be associated with a transaction T. When such a path is given to traverse a prefix tree, the path may be decomposed into a sequence of (component, transaction) pairs: ($D_0$, T), ($D_1$, T), ($D_2$, T) ... ($D_n$, T), where $D_0$ is the root directory "\". This sequence of component, transaction pairs may then be compared to the prefix tree entries in order. A prefix tree entry node N may be compared to a ($D_i$, T) pair using the following algorithm:

1. First, compare Name(N) and $D_i$, if they are not the same, return the string compare result of Name(N) and D, which is either "GreaterThan" or "LessThan".

For the following steps, Name(N) equals $D_i$

2. If State(N) equals TxNotTransacted, return "Equal". A non transacted node should be seen by all entities.

3. If State(N) equals TxNewName, return the compare result of Transaction(N) and T. For example, if Transaction (N) equals T, return "Equal"; if Transaction(N)≠T, a rule may be defined as follows: if the digits representing Transaction (N)>T, return "GreaterThan"; if the digits representing Transaction(N)<T, return "LessThan".

4. If State(N) equals TxRenameOnCommit or TxDeleteOnCommit, return "Equal" if Transaction(N)≠T; return "GreaterThan" if Transaction(N) equals T. A tree node in the state of TxRenameOnCommit or TxDeleteOnCommit should not be viewable to the transaction that modified it.

Note, in step 4, a tree traversal algorithm may also choose to return "LessThan" if Transaction(N) equals T. Once a value is chosen, it should continue to be used.

Using the above algorithm, a multi-transaction view of a prefix tree may be supported.

In another embodiment, a prefix tree may be traversed as defined by the following pseudo-code, where the sub compare routines CompareString and CompareNumber may return "Equal," "GreaterThan," or "LessThan" depending on the inputs.

```
INT
TreeTraversalCompareKeys (
    STRING TreeEntryKey1,
    PTREE_TX_KEY TreeEntryKey2,
    STRING ComponentName,
    PVOID Transaction
    )
{
    If TreeEntryKey1 ≠ ComponentName
        Return CompareString( TreeEntryKey1, ComponentName );
    If TreeEntryKey2->Transaction == NULL
        Return Equal;
    If TreeEntryKey2->State == TxNewName
        Return CompareNumber( TreeEntryKey2->Transaction,
            Transaction );
    If TreeEntryKey2->State == TxRenameOnCommit or
    TxDeleteOnCommit
        Return ! CompareNumber( TreeEntryKey2->Transaction,
            Transaction );
}
```

Renaming Example

Figure 9A:
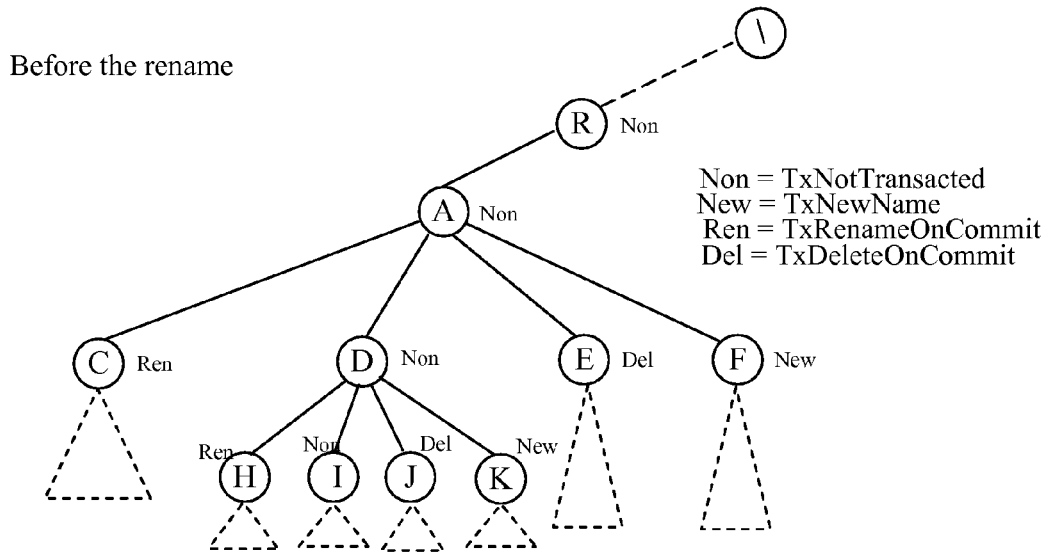
FIGS. 9A and 9B are block diagrams that represents an exemplary prefix tree before and after a rename operation in accordance with aspects of the subject matter described herein.
Figure 9B:
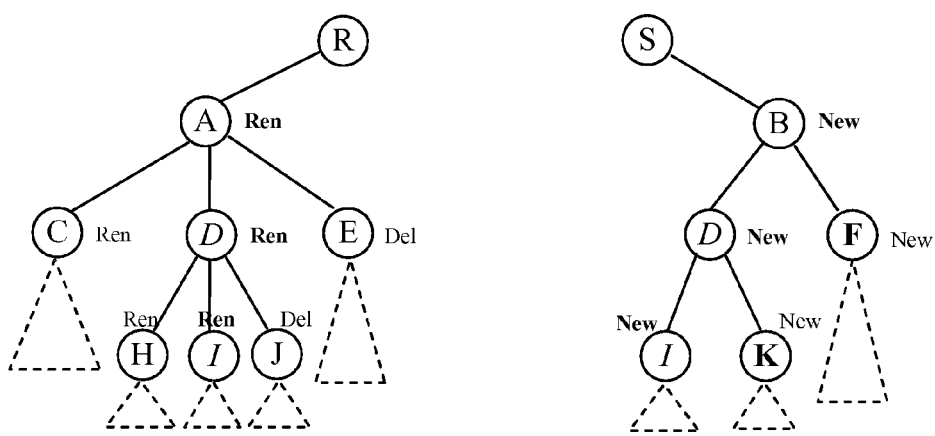

FIGS. 9A and 9B are block diagrams that represents an exemplary prefix tree before and after a rename operation in accordance with aspects of the subject matter described herein. FIG. 9A illustrates a combined (i.e., non-transacted and transacted) tree view before the rename. FIG. 9B shows two sub trees after renaming \ ... \R\A to \ ... \S\B.

If the transactional file system allows the rename operation, then all the tree nodes under \ . . . \R\A are either non-transacted or within the same transaction.

Before the rename, the children nodes under \ . . . \R\A can be at all states. For example, turning to FIG. 9A, S(C)=TxRenameOnCommit and indicates that C was renamed inside of a transaction previously. C's peer containing the transacted target name may or may not be under A. S(E)=TxDeleteOnCommit indicates that node E was deleted inside a transaction previously. In one embodiment, these two kinds of nodes stay under A when A is renamed.

In one embodiment, node F, on the other hand, which is a transacted new name, is moved to the new target tree under the transacted new name B. Node D, which is non-transacted, is duplicated to the transacted new tree B. All non-deleted child nodes of D recursively apply the same rule when renamed.

Renaming a prefix tree entry whose state is TxNewName will cause the entry to be moved. Note that there is a special case when renaming a node with a new name back to its peer's original name. For example, if B is renamed back to A, there may be two tree entries of the same name. One of the tree entries has a state of TxRenameOnCommit while the other has a state of TxNewName. This does not cause a problem in this transacted prefix tree model.

For simplicity in implementation or other reasons, renaming a prefix tree entry whose state is TxRenameOnCommit or TxDeleteOnCommit may be disallowed by the transactional file system or otherwise.

Filter Actions

A library may be created to manipulate the prefix tree in accordance with what has been described above. This library may be called by multiple filters.

To make filters transaction aware, a filter may register with a kernel transaction notification callback to receive transaction commit and rollback notifications.

A filter may selectively register with the library to be notified if a prefix tree entry is renamed or deleted in a transaction. A transaction context may be attached after the enlistment so that it can be detected whether the filter is already enlisted in the transaction.

Upon receiving a commit/rollback notification, the filter will commit or rollback the tree. On commit, in one embodiment, the filter may:

1. Use a depth first algorithm so that the tree entry to be deleted can be removed from the tree immediately. The algorithm may use its own stack to avoid recursion, if desired.

2. If an entry's state is TxNotTransacted, continue to the next entry.

3. If an entry's state is TxRenameOnCommit, the entry is removed from the tree. At this time, the entry may be validated to make sure that it has no children. Note, that if the operations have been done correctly all of the node's children have already been removed already due to their state=TxRenameOnCommit or TxDeleteOnCommit. After the validation, continue to the next entry.

4. If an entry's state is TxDeleteOnCommit, the queued delete action is called and the entry is removed from the tree. Again, validation may be performed to determine that the entry has no children. After the validation, continue to the next entry.

5. If an entry's state is TxNewName, change the state to TxNotTransacted. If the entry has an attached policy, the queued rename callback is called. Then, continue to the next entry.

On rollback, in one embodiment, the filter may:

1. Use a depth first algorithm so that the entry to be deleted can be removed from the tree immediately. The algorithm may use its own stack to avoid recursion, if desired.

2. If an entry's state is TxNotTransacted, continue to the next entry.

3. If an entry's state is TxRenameOnCommit or TxDeleteOnCommit change it to TxNotTransacted and then continue to the next entry.

4. If an entry's state is TxNewName, remove it from the tree. Then, continue to the next entry.

Figure 11:
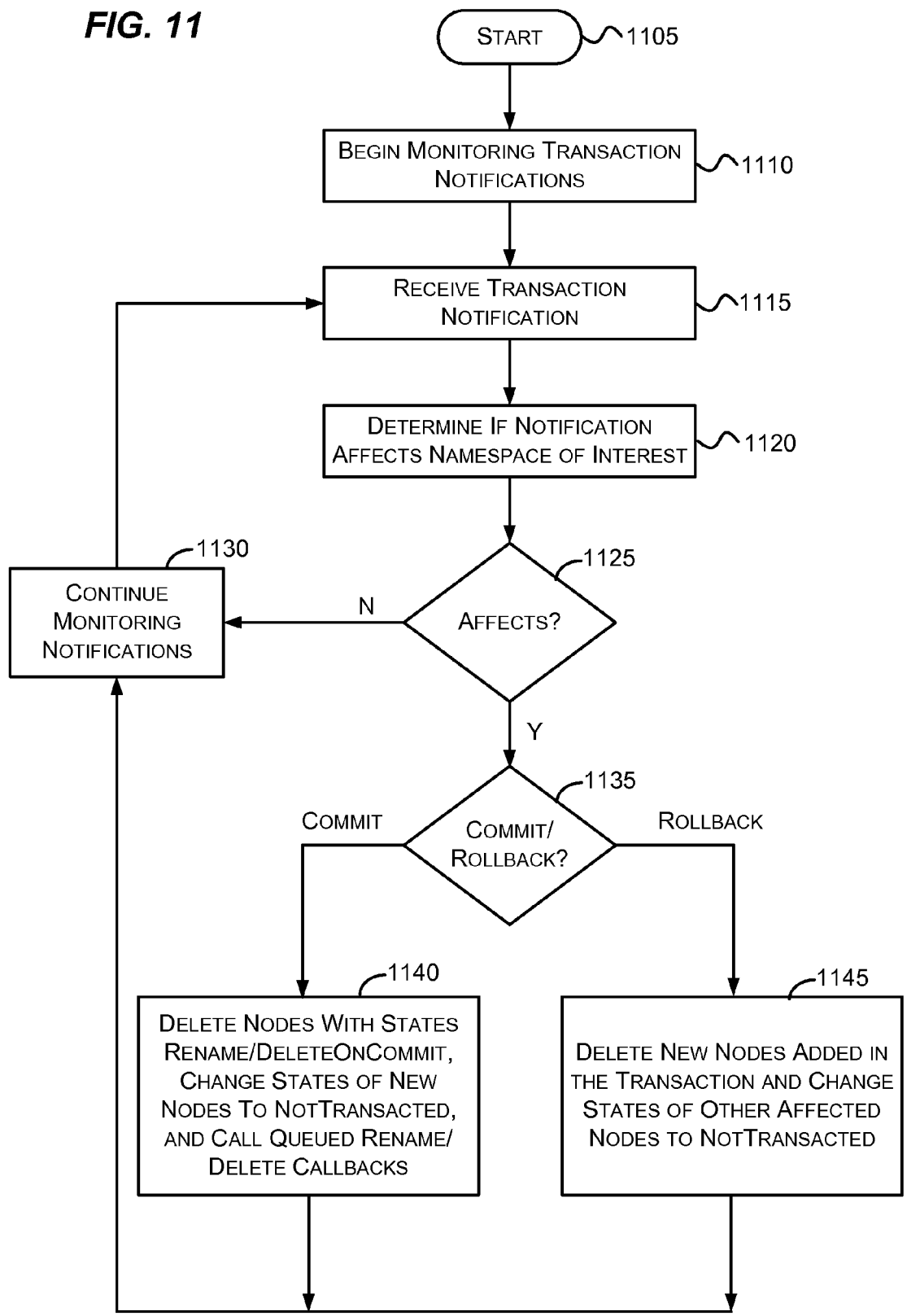

FIGS. 10-11 are flow diagrams that generally represent exemplary actions that may occur in accordance with aspects of the subject matter described herein. For simplicity of explanation, the methodology described in conjunction with FIGS. 10-11 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 10, at block 1005, the actions begin. At block 1010, changes to a namespace of a transaction capable file system are monitored. For example, referring to FIG. 4, the filter 230 registers for notification of deletes and renames of objects of the transactional file system 225. Note, a change to the namespace may involve adding, deleting, or renaming an object to the file system.

At block 1015, a request regarding an object is received. For example, referring to FIG. 4, the filter 230 may receive a request that indicates that the requester seeks to rename an object of the transactional file system 225.

At block 1020, a determination is made as to whether the request affects a namespace of interest. As indicated previously, one case of interest, for example, is if the request affects finding and application of a policy of a prefix tree. For example, referring to FIGS. 5 and 6, when the \D\E directory is renamed to be \H, this is of interest as it affects the finding and application of the policy P3. The tree traversal algorithm stated earlier can be used to determine whether a name is of interest as it is visible inside or outside a transaction.

At block 1025, if the request affects a namespace of interest, the actions continue at block 1032; otherwise, the actions continue at block 1030.

At block 1030, monitoring continues until another request is received at block 1015.

At block 1032, a determination is made as to whether the change is a transacted rename or delete. If so the actions continue at block 1035; otherwise, the actions continue at block 1033.

At block 1033, the data structure is changed for non-transacted usage to reflect the change caused by the request.

At block 1035, the data structure is modified to track changes to the namespace. For example, referring to FIGS. 5 and 6, if a rename operation is received, new nodes \H and \H\F' may be added to the data structure of FIG. 5 to obtain the data structure of FIG. 6.

At block 1040, the states of the nodes within the data structure are changed to indicate usability inside and outside of a transaction. For example, referring to FIG. 6, in a rename operation before committing, the nodes \D\E and \D\E\F may be marked as TxRenameOnCommit which indicates that they are not to be used inside the transaction but may be used by entities not associated with the transaction. In addition, the nodes \H and \H\F' may be marked as TxNewName which indicates that they may be used during the transaction by entities within the transaction but not by entities outside the transaction.

After block 1040, the actions continue at block 1030, where monitoring continues. The actions associated with the blocks of FIG. 10 may continue as long as monitoring of namespace activity is desired.

FIG. 11 is a flow diagram that generally represents actions that may occur in tracking namespace change in accordance with aspects of the subject matter described herein. At block 1105, the actions begin.

At block 1110, changes to a namespace of a transaction capable file system are monitored. For example, referring to FIG. 4, the filter 230 registers for the transaction notification of deletes and renames of objects of the transactional file system 225. Note, a transaction notification may involve commit, rollback, or prepare to the transactions which are being monitored.

At block 1115, a transaction notification is received. For example, referring to FIG. 4, the filter 230 may receive a commit or rollback notification associated with a monitored transaction.

At block 1120, a determination is made as to whether the transaction notification affects a namespace of interest. One case of interest, for example, is if the transaction notification is a commit or rollback transaction notification.

At block 1125, if the transaction notification affects a namespace of interest, the actions continue at block 1135; otherwise, the actions continue at block 1130.

At block 1130, monitoring continues until another transaction notification is received at block 1115.

At block 1135, a determination is made as to whether the transaction notification is a commit notification or a rollback notification. If the transaction notification is a commit notification, the actions continue at block 1140; otherwise, the actions continue at block 1145.

At block 1140, nodes that are to be renamed on commit or deleted on commit (e.g., nodes with states TxRenameOnCommit and TxDeleteOnCommit) are processed and deleted from the prefix tree. New nodes (e.g., nodes with a state of TxNewName) are changed to no longer be new (e.g., their states are changed to TxNotTransacted). In addition, queued rename callbacks and queued delete callbacks are called.

At block 1145, new nodes added within the transaction are deleted (e.g., by deleting nodes with the state TxNewName). In addition, nodes within the transaction that have other states (e.g., TxRenameOnCommit or TxDeleteOnCommit) are changed back to their states that they had before the transaction commenced (e.g., TxNotTransacted).

The actions described in conjunction with FIG. 11 may continue as long as tracking is desired. Note also that the actions may be performed in parallel with the actions described in conjunction with FIG. 10.

As can be seen from the foregoing detailed description, aspects have been described related to tracking file system namespace changes during transactions. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A tangible computer-readable storage medium having computer-executable instructions, which when executed perform actions, comprising:
   receiving a request regarding an object of a transactional file system, the request being associated with a transaction and requiring deletion of the object;
   modifying the state of a node that uniquely represents the object in a data structure used to track a namespace of the transactional file system responsive to receiving the request, wherein modifying the state of the node comprises changing the node from a state in which the node is visible to the transaction to a state in which the node is invisible to the transaction; and
   responsive to modifying the state of the node, indicating that the node is not usable by a first entity but is usable by a second entity, the first entity being associated with the transaction, the second entity not being associated with the transaction.

2. The computer-readable medium of claim 1, wherein the request further requires creation of a second object, the method further comprising:
   creating a second node that represents the second object in the data structure responsive to receiving the request and setting the state of the second node to a state in which the second node is visible to the transaction only, and
   responsive to setting the state of the second node, indicating that the second node is usable by the first entity during the transaction but is not to be used by the second entity during the transaction.

3. The computer-readable medium of claim 2, further comprising indicating that the second node is usable by all entities if the transaction commits.

4. The computer-readable medium of claim 2, further comprising deleting the second node if the transaction rolls back.

5. The computer-readable medium of claim 1, further comprising deleting the first node if the transaction commits.

6. The computer-readable medium of claim 1, further comprising indicating that the first node may be used by the first and second entities if the transaction rolls back.

7. The computer-readable medium of claim 1, wherein the request comprises a request to delete the object.

8. The computer-readable medium of claim 1, wherein the request comprises a request to rename the object.

9. The computer-readable medium of claim 8, wherein renaming the object comprises moving the object to another location within the namespace.

10. The computer-readable medium of claim 9, wherein renaming the object comprises changing a name of the object.

11. The computer-readable medium of claim 1, wherein the object comprises a directory.

12. A method comprising:
   monitoring changes to a namespace of a transactional file system;
   receiving a change that deletes an object associated with a policy, the change occurring within a transaction;
   updating the state of a node that uniquely represents the object in a data structure responsive to receiving the change; and
   responsive to updating the state of the node, indicating that the node is visible to processes operating outside the transaction and invisible to processes operating within the transaction;

wherein the monitoring, receiving, updating and indicating steps are performed by a processing unit of a computer.

13. The method of claim 12, wherein monitoring changes to a namespace of a transaction file system comprises a filter monitoring requests and responses thereto.

14. The method of claim 13, wherein the filter is capable of changing, completing, and aborting each request and response.

15. The method of claim 13, wherein the filter comprises an object that is capable of examining each request sent to and each response received from the transactional file system.

16. The method of claim 12, wherein the change comprises a renaming of the object.

17. The method of claim 12, wherein the change comprises a deletion of the object.

18. An apparatus, comprising:
a processing unit; and
a memory coupled to the processing unit, the memory storing:
a file system the, when executed by the processing unit, operates on an object within the file system via a transaction that includes an operation that deletes the object;
an entity that, when executed by the processing unit, requests access to the object within the transaction; and
a filter that, when executed by the processing unit, examines selected communication between the file system and the entity and that updates the state of a node uniquely associated with the object in a data structure used to track a namespace of the file system responsive to detecting the deletion operation, wherein updating the state of the node comprises changing the state of the node from visible to the transaction to invisible to the transaction, and that indicates that the process is not allowed to use the node during the transaction to enforce a policy responsive to the updating of the state of the node.

19. The apparatus of claim 18, wherein the filter, when executed by the processing unit, further creates a second node that represents a second object created by an operation within the transaction, sets the state of the second node to a state in which the second node is visible to the transaction only, and indicates that the process is allowed to use the second node during the transaction to enforce the policy inside the transaction.

20. The apparatus of claim 18, wherein the filter, when executed by the processing unit, further indicates that any other processes are allowed to use the node during the transaction to enforce the policy outside the transaction.

* * * * *